July 14, 1953 V. C. STERRETT 2,645,513
CYLINDER CONSTRUCTION
Original Filed Dec. 31, 1947
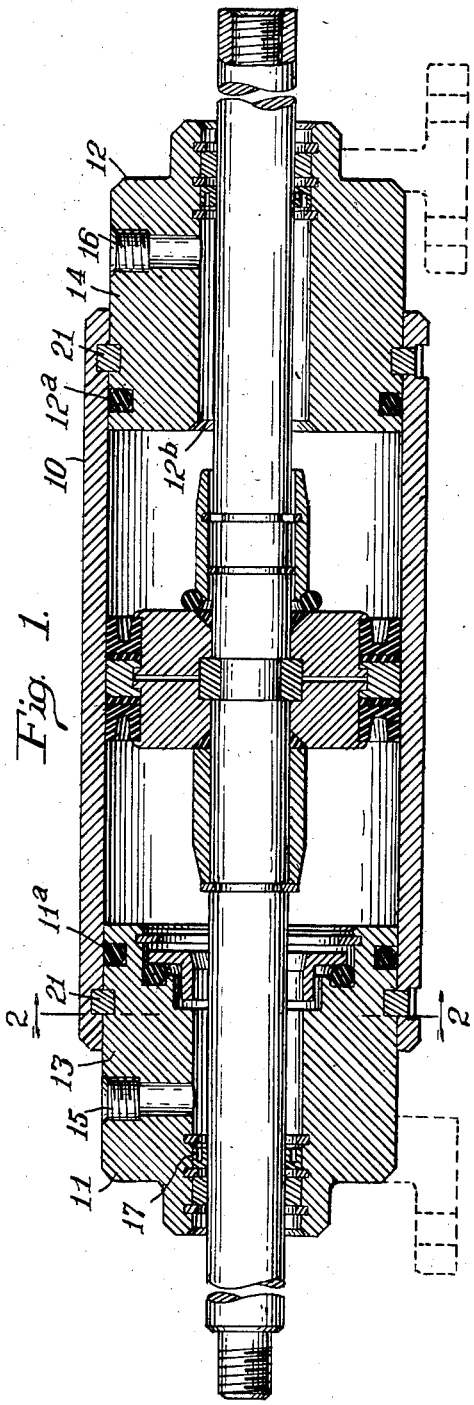
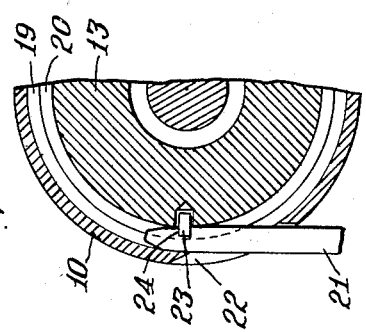
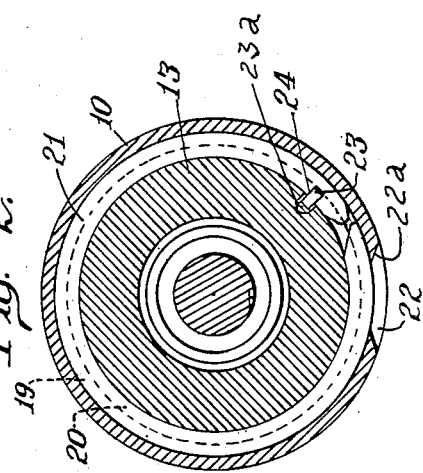
INVENTOR
*Vance C. Sterrett*
BY
ATTORNEYS Patented July 14, 1953

2,645,513

UNITED STATES PATENT OFFICE 2,645,513

CYLINDER CONSTRUCTION

Vance C. Sterrett, Logansport, Ind.

Original application December 31, 1947, Serial No. 794,975. Divided and this application July 29, 1949, Serial No. 107,535

1 Claim. (Cl. 292—256.6)

My present invention relates to a method of attaching end closures to cylindrical tube ends and is a division of my copending application S. N. 794,975, filed December 31, 1947, now Patent 2,493,602, granted January 5, 1950.

An object of my invention resides in the means employed for internally connecting the cylinder heads within the ends of the cylinder whereby the cross sectional size of the instrument is determined by the external diameter of the cylinder thus enabling such device designed for delivering a given power output to be compactly constructed and rendered capable of use in confined spaces in conjunction with various types of machines on which the power apparatus may be employed.

Another object of my invention is to provide a means for attaching cylinder heads to a cylinder whereby the use of tie rods or bolt flanges in connection with the construction is eliminated.

A further object of the present invention is the provision of alined grooves in hydraulic cylinder and cylinder head which grooves are adapted to receive a cooperating shear bar and shear pin for internally connecting the cylinder and head.

Still another object of the invention is to provide a connecting means consisting of a shear bar and individual shear pin which will afford an increased stress capacity in a hydraulic cylinder assembly.

A still further advantage of my invention lies in the fact that the provision of individual shear bar and pin units permits the fabrication of these units from different materials increasing the operational life of the connecting means.

To these and other ends my invention comprises further improvements and advantages as will be further described in the accompanying specification, the novel features thereof being set forth in the appended claim.

In the drawings:

Figure 1 is a central longitudinal cross section of a power force cylinder embodying my invention.

Fig. 2 is a vertical cross section taken on the line 2—2 of Fig. 1 showing the means I employ for locking the cylinder heads within the ends of the cylinder.

Figure 3 is a similar view showing the manner in which the locking key is applied.

Similar reference numerals, in the several figures, indicate similar parts.

In carrying out my invention the fluid power unit comprises a hydraulic cylinder 10 of an internal diameter suitable to the ultimate power to be delivered and of a length selected according to the nature of the work to be performed by the enclosed piston and piston rod. The ends of the cylinder are closed by the opposed heads 11 and 12 having inner or proximate ends 13 and 14 which fit closely within the ends of the cylinder, their remaining or outer portions being of such dimensions as to accommodate fluid inlet or outlet ports 15 and 16 and take piston rod packing glands 17 and 18 located outwardly beyond said ports. As is common practice in the operation of hydraulic cylinders the source of fluid pressure be it oil, water or air is connected through a four way control valve to the ports 15 and 16 so that it may alternately be introduced at the one end of the cylinder to act on one side of the piston and allowed to exhaust from the opposite side of the piston. Since this master valve is well known in the art I have omitted illustration thereof.

As will be seen from Fig. 1 of the drawing the overlapping portions of the cylinder and each of the opposed heads 11 and 12 are provided with mating annular recesses or grooves. The groove 19 (Fig. 3) is formed in the inner wall surface of the hydraulic cylinder 10 and the alined groove 20 is in turn machined around the periphery of the end head. Annular grooves 19 and 20 cooperate to accommodate a locking strip or shear bar 21, the latter being preferably rectangular in cross section and beveled at each end to permit ease in insertion and removal of the bar.

To facilitate the insertion of the shear bar 21 into the channel formed by mating grooves 19 and 20 an arcuate opening 22 is provided in the wall of the cylinder. As best seen in Fig. 3, the ends of opening 22 are tapered inwardly as at 22ª to permit a straight line entrance of the shear bar as it progesses to and from the alined grooves 19 and 20. This tapered effect of the opening furthermore lessens the tendency for the accumulation of dirt, grit or other foreign matter at this point all of which adds to efficient operation of the present novel locking means.

A drilled hole or milled slot 23ª is formed in the cylinder head at any point in the bottom of recess 20. This hole is adapted to receive a small shear or anchor pin 23 which projects radially outwardly into recess 20. The function of shear pin 23 is to secure the cylinder head 13 and shear bar 21 against relative rotational movement. This fixed relationship is made possible by a transverse milled slot 24 formed on the inner surface of the shear bar and in proximity with the forward or lead end thereof. By means of slot 24 the leading end of the shear bar may be hooked in engagement with the pin 23 to enable the bar to be drawn into the internal groove formed by recesses 19 and 20. It is to be understood that variation of the forming and positioning of the cooperating hole 23a and shear pin are anticipated and that the form shown in the drawing has been utilized for the purpose of description.

In the operation of my locking means the projecting shear pin 23 is first positioned in alinement with opening 22 in the cylinder and the milled slot in the forward end of shear bar hooked over the pin to connect the bar and cylinder head for concurrent rotational movement. Continued clockwise rotation of the cylinder head will feed the shear bar into the internal receiving groove between the cylinder and head until the bar lies completely within the confines of the groove thus effectively locking the units against relative longitudinal movement.

When it is desired to disassemble the hydraulic cylinder the end cover 13 is rotated in a counter-clockwise direction until the beveled end of the shear bar appears at the milled opening in the tubing 10. At this point a screw driver or other suitable tool is inserted under this beveled edge to start the shear bar through the opening and thereafter continued turning of the end cover completely removes the bar from the internal groove enabling the previously connected elements to be separated.

The advantage to the industry afforded by the utilization of a locking means consisting of a non-integral shear bar and pin arrangement cannot be over-emphasized. The customary procedure in the use of conventional locking wires is to form a small right-angle bend at one end of the wire to act as an anchoring means for holding the wire relative to the turning head. In order to facilitate proper application of a locking wire the material from which the wire is made must have a low bending movement which necessitates the use of such metals as brass, aluminum and the like. When the conventional locking wire or bar is made from these materials the inwardly extending end portion either shears off or straightens out again. Each assembly of a unit requires that this inwardly extending portion suffer and hold under the force required to draw the bar within the whole annular passageway, then to extract the bar, the forces are applied in exactly the opposite direction, hence it requires but a few assemblies and disassemblies for this projection to yield and break off, leaving the cylinder and plug assembled to the cylinder tube with no salvageable way to separate the two.

From a manufacturing point of view, when the right angle bend is made to form the inwardly extending anchorage, right in the bend the cross section of the locking element is distorted. The thickness of this section is reduced and simultaneously the lateral dimension increases. Since the internal passageway and the locking bar are so machined as to afford a close fit it is necessary that the excess material caused by lateral bulging of the bar when bent be removed to prevent fouling of the bar against the sides of the passageway. The removal of this excess further weakens the bar at the point where additional strength is required.

In my present invention, by designing the shear bar and shear pin as separate elements I am able to make my shear bar 21 from a metal of suitable pliability such as S. A. E. brass 72 or other suitable material equally adequate in shear strength and corrosion resistance to always permit disassembly after long being assembled. At the same time anchor pin 23 may be preferably of steel.

As will be apparent from Figs. 2 and 3 of the drawing, the thrust given by the anchor pin 23 to the shear bar 21 is taken in an abutting manner by a side of the transverse slot 24 in the bar. This construction permits an infinite number of operational assemblies and disassemblies of the hydraulic device without harm to the locking means.

The anchor pin and notch feature of my shear bar permits this internal locking means to be used for large cylinders whereas the conventional bent-end locking devices of round stock used at the present time are limited to use with cylinders of approximately a 3-inch bore. The unique construction of the present invention will produce a locking means with a safety factor of approximately 12½ which is more than double that normally required for hydraulic media.

From the foregoing description of my present invention it will be seen that I have devised an internal locking means for hydraulic cylinders which will provide a compactly constructed unit having neither tie rods nor bolt flanges extending beyond its outer surface thereby permitting larger cylinders to be mounted in a given limited space.

The design of this connecting means not only greatly increases the resistance of the cylinder against internal hydraulic force, but also allows the assembly and disassembly of the unit a countless number of times without failure on the part of the connecting elements.

While a preferred form of the invention has been shown and described, it will be understood that variation in details of form may be made without departure from the invention as defined in the appended claim.

I claim:

A separable connection between relatively rotatable telescoping elements comprising, a cylindrical cover having an inner cylindrical surface with an annular recess therein and a peripheral opening leading into said recess, said opening having a width at least as wide as said recess, a cylindrical head fitting into said cover and having an annular recess in the periphery thereof and adapted to register with the recess in the cover, an anchor pin of hard shear resistant material mounted in said head and projecting radially therefrom into the recess formed therein, and a locking strip, said strip having a cavity therein adjacent one end and engaging said pin, said strip having a cross sectional area substantially equal to the combined cross sectional area of said recesses when said recesses are registered.

VANCE C. STERRETT.

References Cited in the file of this patent

UNITED STATES PATENTS

| Number | Name | Date |
|---|---|---|
| 170,155 | Caswell | Nov. 23, 1875 |
| 360,663 | Daniels | Apr. 5, 1887 |
| 1,464,386 | Ingram | Aug. 7, 1923 |
| 2,403,368 | Howard | July 2, 1946 |
| 2,414,529 | Ives | Jan. 21, 1947 |
| 2,436,407 | Stephens | Feb. 24, 1948 |
| 2,552,098 | Kirstin | May 8, 1951 |